US012670314B2

(12) United States Patent
Chen et al.

(10) Patent No.: US 12,670,314 B2
(45) Date of Patent: Jun. 30, 2026

(54) INTERACTION METHOD AND APPARATUS, AND ELECTRONIC DEVICE FOR DISPLAYING A DOCUMENT AND COMMENTS WITHIN ANOTHER DOCUMENT

(71) Applicant: BEIJING ZITIAO NETWORK TECHNOLOGY CO., LTD., Beijing (CN)

(72) Inventors: Wei Chen, Beijing (CN); Baofa Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 18/287,135

(22) PCT Filed: Feb. 23, 2022

(86) PCT No.: PCT/CN2022/077504
§ 371 (c)(1),
(2) Date: Oct. 16, 2023

(87) PCT Pub. No.: WO2022/218034
PCT Pub. Date: Oct. 20, 2022

(65) Prior Publication Data
US 2024/0211683 A1      Jun. 27, 2024

(30) Foreign Application Priority Data
Apr. 16, 2021      (CN) ......................... 202110416041.9

(51) Int. Cl.
*G06F 40/169*      (2020.01)
*G06F 3/0481*      (2022.01)
*G06F 40/106*      (2020.01)

(52) U.S. Cl.
CPC .......... *G06F 40/169* (2020.01); *G06F 3/0481* (2013.01); *G06F 40/106* (2020.01)

(58) Field of Classification Search
CPC ..... G06F 40/106; G06F 40/169; G06F 3/0481
(Continued)

(56) References Cited

U.S. PATENT DOCUMENTS 5,826,025 A * 10/1998 Gramlich .............. G06F 16/957
707/E17.119
8,321,784 B1      11/2012 Ranganathan et al.
(Continued)

FOREIGN PATENT DOCUMENTS

CN      105975601 A      9/2016
CN      108984502 A      12/2018
(Continued)

OTHER PUBLICATIONS

International Patent Application No. PCT/CN2022/077504; Int'l Written Opinion and Search Report; dated May 31, 2022; 7 pages.

*Primary Examiner* — Daniel Samwel
(74) *Attorney, Agent, or Firm* — BakerHostetler

(57)      ABSTRACT

An interaction method, an electronic device, and a computer-readable medium are provided. The method includes: determining a first selected object in response to reception of a first selection operation in a content area of a first document, where the content area is configured to display content of a second document displayed in the first document; and displaying response information in response to a response operation for the first selected object.

19 Claims, 7 Drawing Sheets

(58) Field of Classification Search
USPC ........................................................ 715/230
See application file for complete search history.

(56)                                References Cited

U.S. PATENT DOCUMENTS

| 10,198,406  | B2 * | 2/2019  | Pan ....................... | G06F 40/103 |
|---|---|---|---|---|
| 2011/0320933 | A1 * | 12/2011 | Sanami ................. | G06F 40/186 |
|  |  |  |  | 715/246 |
| 2012/0081375 | A1 * | 4/2012  | Robert ................. | G06F 40/106 |
|  |  |  |  | 345/522 |
| 2012/0143958 | A1 | 6/2012 | Augustine |  |
| 2013/0097481 | A1 | 4/2013 | Kotler et al. |  |
| 2014/0033015 | A1 | 1/2014 | Shaver |  |
| 2015/0186385 | A1 * | 7/2015 | Reynar .............. | G06F 16/2228 |
|  |  |  |  | 707/726 |
| 2016/0117289 | A1 * | 4/2016 | Pan ....................... | G06F 40/169 |
|  |  |  |  | 715/230 |
| 2017/0039168 | A1 * | 2/2017 | Hassan .................. | G06Q 10/10 |
| 2019/0005616 | A1 * | 1/2019 | de la Fuente ......... | G06F 40/169 |
| 2019/0286383 | A1 * | 9/2019 | Ito .......................... | G06F 3/1286 |
| 2021/0110103 | A1 * | 4/2021 | Casas ..................... | G06F 16/51 |
| 2021/0271495 | A1 * | 9/2021 | Smith .................... | G06F 16/93 |

FOREIGN PATENT DOCUMENTS

| CN | 109492210 | A | 3/2019 |
|---|---|---|---|
| CN | 111580714 | A | 8/2020 |
| CN | 112114734 | A | 12/2020 |
| CN | 113128185 | A | 7/2021 |

* cited by examiner

901

902

903

904

905

INTERACTION METHOD AND APPARATUS, AND ELECTRONIC DEVICE FOR DISPLAYING A DOCUMENT AND COMMENTS WITHIN ANOTHER DOCUMENT

CROSS-REFERENCE TO RELATED APPLICATIONS

The present application is the national phase of International Application No. PCT/CN2022/077504, titled "INTERACTION METHOD AND APPARATUS, AND ELECTRONIC DEVICE", filed on Feb. 23, 2022, which claims priority to Chinese Patent Application No. 202110416041.9, titled "INTERACTION METHOD AND APPARATUS, AND ELECTRONIC DEVICE", filed on Apr. 16, 2021, both of which are incorporated herein by reference in their entireties.

FIELD

The present disclosure relates to the field of internet technologies, and in particular, to an interaction method and apparatus, and an electronic device.

BACKGROUND

With the development of science and technology, the functions of terminal applications are increasingly improved. For example, some office applications support browsing online documents. In the online document, attachment files can be uploaded. When browsing an online document, a user can select text in the online document and add comments to the text in the online document (for example, point out the typos in the document, adding his own insights, and the like).

SUMMARY

This summary section is provided to introduce concepts in a simplified form that are described in detail in the embodiment section that follows. This summary section is not intended to identify key features or essential features of the claimed technical solution, nor is it intended to be used to limit the scope of the claimed technical solution.

An interaction method, an interaction apparatus, and an electronic device are provided according to the embodiments of the present disclosure. When in a preview states, an attachment document may be commented at any area in the attachment document.

In a first aspect, an interaction method is provided according to an embodiment of the present disclosure, the method includes: determining a first selected object in response to reception of a first selection operation in a content area of a first document, where the content area is configured to display content of a second document displayed in the first document; and displaying response information in response to a response operation for the first selected object.

In a second aspect, an interaction apparatus is provided according to an embodiment of the present disclosure, the apparatus includes: a first determination unit, configured to determine a first selected object in response to reception of a first selection operation in a content area of a first document, where the content area is configured to display content of a second document displayed in the first document; and a display unit, configured to display response information in response to a response operation for the first selected object.

In a third aspect, an electronic device is provided according to an embodiment of the present disclosure. The electronic device includes one or more processors; and a storage apparatus configured to store one or more programs. The one or more programs, when executed by the one or more processors, cause the one or more processors to implement the above interaction method of the first aspect.

In a fourth aspect, a computer-readable medium on which a computer program is stored is provided according to an embodiment of the present disclosure. The program, when executed by a processor, implements steps of the above interaction method of the first aspect.

With the interaction method and apparatus, and the electronic device according to the embodiments of the present disclosure, the second document may be presented in the content area of the first document, and when it is detected that the first selection operation is performed for the second document, the first selected object indicated by the first selection operation may be determined, and the response information may be displayed in response to a response operation corresponding to the first selection operation. In this way, when the user finds that certain document content of the second document needs to be commented, the user only needs to perform a selection operation on the document content, and then perform a response operation for the document content to comment on the document content. In other words, when the document is previewed, the user can comment on text content in any area of the document, thereby improving accuracy in the process of the user commenting on the document.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DESCRIPTION OF EMBODIMENTS

Figure 1:
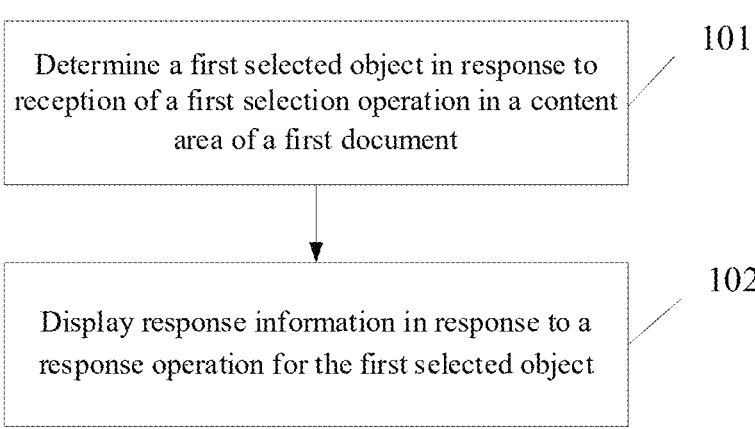
FIG. 1 is a flowchart of an interaction method according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders, and/or performed in parallel. Furthermore, method embodiments may include additional steps and/or omit performing the illustrated steps. The scope of the present disclosure is not limited in this regard.

As used herein, the term "including" and variations thereof are open-ended inclusions, i.e., "including but not limited to". The term "based on" is "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish between different devices, modules or units, and are not used to limit the order of functions performed by these devices, modules or units or interdependence between these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or a plurality of".

The names of messages or information exchanged between multiple devices in the embodiments of the present disclosure are for only illustrative purposes, and are not intended to limit the scope of these messages or information.

Reference is made to FIG. 1, which shows the flow of an interaction method according to an embodiment of the present disclosure. This interaction method is applicable to a terminal device. As shown in FIG. 1, the interaction method includes the following steps 101 and 102.

In step 101, a first selected object is determined in response to reception of a first selection operation in a content area of a first document.

Here, the content area is configured to display content of a second document displayed in the first document.

For example, the content area may be provided at a position according to the actual situation, and the position at which the content area is provided is not limited here. Correspondingly, a size of the content area may be set according to the actual situation, for example, the size of the content area may be ½ of the page size of the first document. In some implementations, the user may further manually adjust the size of the preview area.

Here, the first document may be understood as an online document. For example, when a user browses an online document, the user may preview an attachment document (which may be understood as the second document) embedded in the online document (which may be understood as the first document), that is, content of the attachment document may be presented in the content area.

For example, multiple attachment documents may be embedded in the first document, and the second document may be understood as any one of the multiple attachment documents.

Here, the user may select part or all of content in the content area by performing the first selection operation, and the selected content may be understood as a selected object. For example, a first selection operation may be a sliding selection operation, a frame selection operation, and the like, and the specific form of the first selection operation is not limited here, and may set according to actual conditions.

Here, the first selected object may be understood as document content of the second document selected by the user.

In step 102, response information is displayed in response to a response operation for the first selected object.

Here, the response operation may be understood as a comment input operation by a user. For example, after the user performs the first selection operation, a window for inputting comments may be presented, and when the user inputs comment content in this window, it may be understood that the user performs the comment input operation.

Here, the response information may be understood as the comment content inputted by the user.

For example, when reading the second document, the user may be confused about some content in the second document. In this case, the user may perform the first selection operation on this part of the document content, to determine this part of content as the selected object, and perform the response operation for this part of content, and response information may be presented (for example, content in the response information may include content for indicating doubts of the user, content for indicating insights of the user, and the like).

As can be seen, in the embodiment of the present disclosure, the second document is presented in the content area of the first document, and when it is detected that the first selection operation is performed on the second document, the first selected object indicated by the first selection operation may be determined, and the response information may be displayed in response to the response operation corresponding to the first selection operation. In this way, when the user finds that certain document content of the second document needs to be commented, the user only needs to perform a selection operation on the document content, and then perform a response operation for the document content to comment on the document content. In other words, when the document is previewed, the user can comment on text content in any area of the document, thereby improving accuracy in the process of the user commenting on the document.

In some embodiments, when a user is editing a certain document (here, the document may be understood as the first document), the user may wish to add an attachment document to the document, to make the document more comprehensive. For example, if the first document is a sports report which involves multiple sports stars, and each sports star may have his or her own introduction articles, these articles for introducing these sports stars may be added to the target document. In this case, these documents for introducing the sports stars may be understood as attachment documents.

Generally, the attachment document may have a lot of content. Therefore, in order to make the first document more concise, when the attachment document is added to the first document, only a document link identifier of the attachment document may be presented, and the user may perform a trigger operation (for example: a single-click operation, a double-click operation, and the like) on the document link identifier of the attachment document to open the attachment document, or the user may input a preview instruction, so that the content area can be presented, and the document can be presented in the content area.

It is to be noted that there are many ways to generate the preview instruction, which are not limited here. For example, the user may move a mouse pointer to the document link of the attachment document, a preview control may be presented on the interface at this time, and the user may perform a trigger operation on the preview control to generate the preview instruction.

For example, the attachment document may be a picture, a PDF (Portable Document Format) document, a Word document, and the like.

For example, the first document may correspond to one content area (in a case that the first document has multiple attachment documents, the multiple attachment documents may all be presented in the same content area), or the first document may correspond to multiple content areas (for example, each attachment document in the first document corresponds to one content area). The specific position at which the content area is set may be configured according to the actual situation, and is not limited here. For example, the content area may be obtained by enlarging an area of an identifier for presenting the attachment document (when the attachment document is added to the first document, the identifier of the attachment document may be presented so that the user is informed that the attachment document is added at a certain position in the first document). Correspondingly, when the user performs the first selection operation on a certain content area in the first document, the document displayed in the content area may be understood as the second document.

Figure 2A:
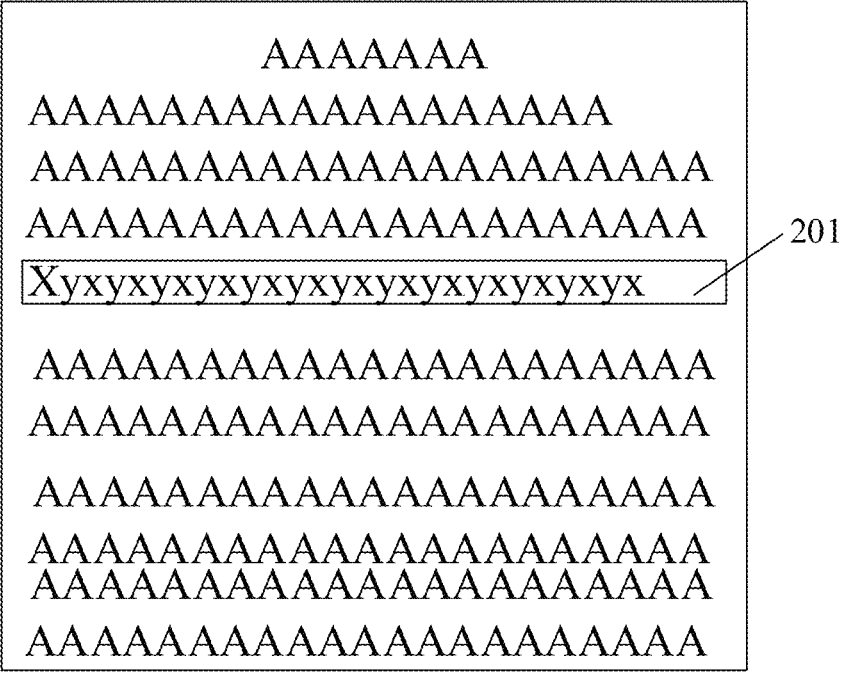
FIGS. 2A and 2B are schematic diagrams of an interaction method according to an embodiment of the present disclosure.
Figure 2B:
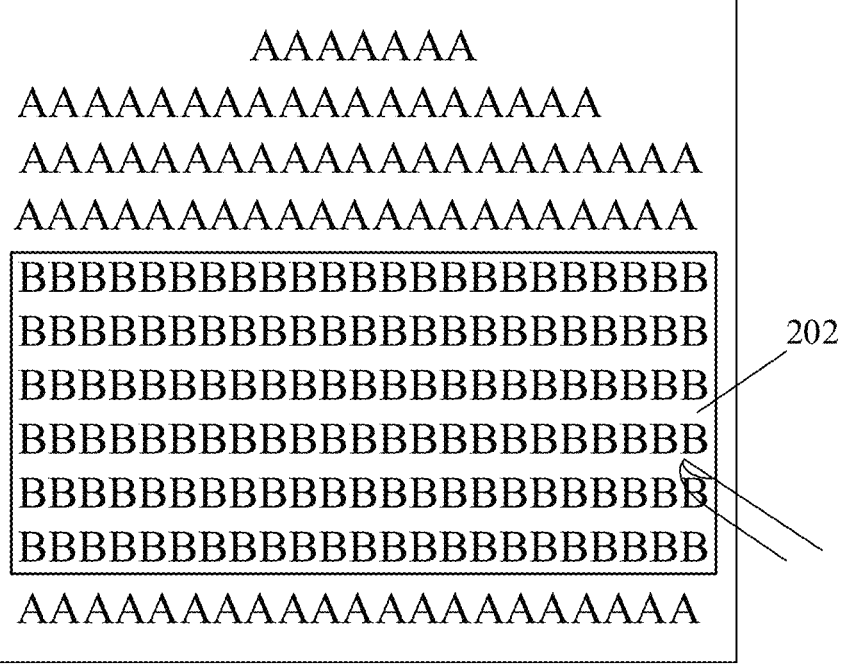

For example, in order to facilitate the understanding of the relationship between the content area and the first document, the relationship between the content area and the first document is described in conjunction with FIGS. 2A and 2B. FIG. 2A is a schematic diagram of presenting a document link identifier of the attachment document in the first document. The attachment document here may be understood as the second document. FIG. 2B is a schematic diagram of presenting the content area and presenting the document content of the second document in the content area. When a preview instruction for the second document is detected, an area 201 presenting the document link identifier of the second document is enlarged to obtain the content area 202. That is, the transition from FIG. 2A to FIG. 2B may be understood as the change in the presentation interface when a preview instruction for the second document is detected. It should be noted that, in an embodiment, the content area 202 may be separated from the area 201 of the document link identifier. For example, the content area is on the right side of the area 201 of the document link identifier, or the content area 202 may alternatively be on the left side of the area 201, or the content area 202 may alternatively be above the area 201.

For example, when the preview instruction is received, the document content of the attachment document may be presented in the content area for preview. If the document content of the attachment document cannot be entirely presented in the content area, the user may perform a sliding operation in the content area, to change the document content of the attachment document presented in the content area. For example, the user may perform an upward sliding operation to scroll the document content of the attachment document in an upward direction.

For example, when the user reads the second document, the user may comment on some parts of the second document (for example, the user does not understand some parts of the second document, the user thinks that content of a certain part of the second document is incorrectly recorded, the user needs to further explain some part of the content of the document, and the like). In this case, the user may perform the first selection operation on the part of the content, and the selected content may be understood as the first selected object. Then, if the response operation for the first selected object (for example, an operation of inputting comment content) is received, the response information may be presented.

For example, the first selection operation may be understood as an operation of selecting document content. Of course, the first selection operation may alternatively be understood as performing frame selection on the document content. For example, if there are several pictures in the document content, the user may select one of the pictures to comment on the picture, or perform frame selection on a certain area of one of the pictures, to comment on only a part of the picture.

Figure 3:
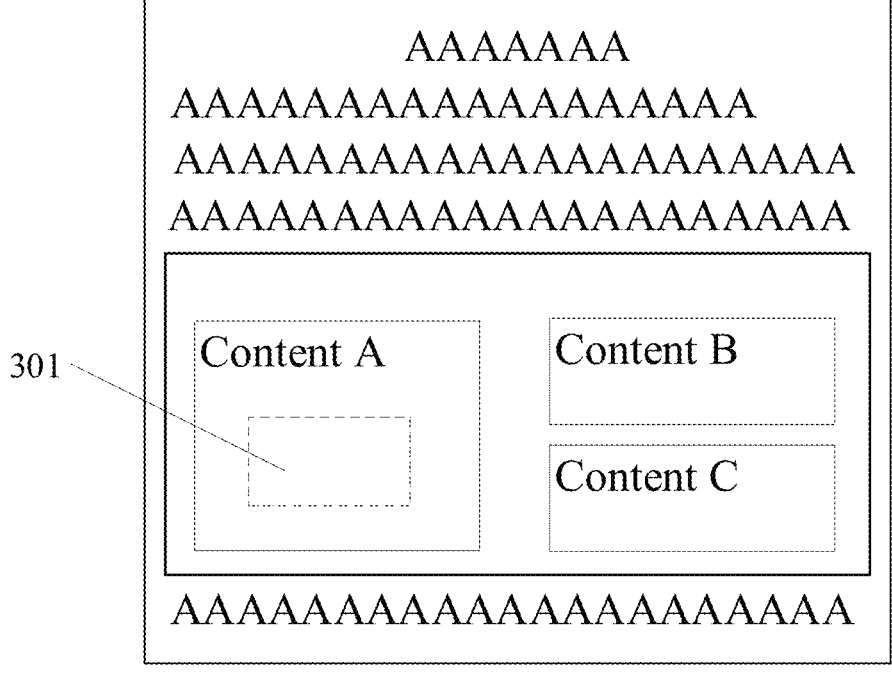
FIG. 3 is a schematic diagram of an interaction method according to another embodiment of the present disclosure.

An example is given for ease of understanding. As shown in FIG. 3, which is a schematic diagram of a preview of the second document. The document content of the second document includes content A, content B, and content C. The user may perform the first selection operation to select content A (for example, click on content A), then content A may be understood as the first selected object. For example, if content A is a picture, and the user only needs to comment on part of the content in the picture, the user may perform a frame selection operation to select only the content in the picture that needs to be commented, and the framed content in the picture (that is, the content in the rectangular frame 301 in the picture) may be understood as the first selected object.

As can be seen, the user may choose different ways to perform the first selection operation based on the content to be commented according to actual needs, so that the user can flexibly comment on the document content in the second document.

In some embodiments, object prompt information corresponding to the first selected object may be presented.

Here, the object prompt information is used to indicate the selected object presented in the content area.

For example, the object prompt information may be a newly added layer, or an identification of a certain color (for example, a red frame, a yellow frame, and the like). It should be noted that the specific form of the object prompt information is not limited here, and can be set according to the actual situation, as long as the selected object selected by the user in the presentation interface can be distinguished from other content when the object prompt information is presented.

As can be seen, by adding corresponding object prompt information to the selected object, the selected object in the document content of the attachment document can be distinguished from other content of the attachment document, so that the user who views the comment can clearly know the object on which the user commented.

In some embodiments, in response to reception of first response content in a first response area corresponding to the first selected object, the first response content is displayed in the first response area.

Here, the first response area may be understood as an area for inputting comments, and correspondingly, the first response content may be understood as inputted comment content.

For example, each selected object may correspond to one response area, that is, comments inputted by different users for the first selected object may be presented in one response area. Of course, each selected object may alternatively correspond to multiple response areas, and correspondingly, comments inputted by different users for the first selected object may be presented in different response areas.

As can be seen, by presenting the response area and the response content, the user can easily be informed of the comments on the selected object, so that the user can better understand the second document (for example, the comment is for further explaining a certain part of the content of the second document).

In some embodiments, in response to the response operation for the first selected object, a presentation position of the response information is determined according to a presentation area of the second document; and the response information is presented at the presentation position.

In some embodiments, in response to detecting that the second document is presented in the content area, it is determined to present the response information in a display interface corresponding to the first document; and in response to detecting that the second document is presented in the display interface, it is determined to present the response information in the display interface.

For example, when the second document is presented in the content area of the first document, the response information may be presented in the first document, and when the second document is opened using the document link identifier of the second document, the second document may be presented in the display interface, which may be understood as the second document being presented in full screen, and the response information may be presented in the second document in this case.

As can be seen, when the second document is presented in the content area, since the content area is in the first document, the content area is smaller than the display interface of the first document; and in order to present as much content as possible of the second document in the content area, the first response area may be presented in the first document, so that the user can browse more content at one time through the content area.

In some embodiments, position information of the first selected object in the second document may be determined, and the response information, the second document and the position information may be sent to a device corresponding to a target account.

Here, the target account includes at least one of the following accounts:

an account that creates the first document and an account that edits the second document.

Here, the first document may be created by using the account that creates the first document, and the second document may be added to the first document by using account that edits the second document.

For example, the first document may be understood as being jointly edited by several people. As shown in FIG. 4, an online document is created by account A, and after the online document is created, area A of the online document may be edited by account A, area B of the online document may be edited by account B, and area C of the online document may be edited by account C; while the second document is positioned at area B. In this case, account A may be understood as the account that creates the online document, and account B may be understood as the account that edits the second document. Therefore, account A and/or account B may be the target account. For example, both account A and account B may be used as target accounts.

For example, it may be understood as: a user corresponding to account A (creating user) creates the first document, and a user corresponding to account B (target editing user) edits area B, that is, the user corresponding to account A may know content recorded in the first document, and the user corresponding to account B may know content recorded in area B of the first document. Therefore, after the user comments on the second document, the response information (which may include comment content and comment box) and the second document may be sent to the device corresponding to the target account. That is, both the creating user and/or the target editing user can quickly receive notifications and be informed of the comment content on the second document. In addition, the creating user and/or target editing user who has received the notification does not need to open the first document to find the response information for the second document, but can be informed, according to the sent content, of the response information and the first selected object corresponding to the response information (since the position information of the first selected object in the second document is also sent), so that the user indicated by the target account can process the response information (which can be understood as a comment) more conveniently. That is, by sending the second document, the response information and the location information to the device corresponding to the target account, the efficiency of processing comments can be improved.

As can be seen, by sending the response information, the second document, and the location information to the target account, the device corresponding to the target account may directly present the first selected object and the response information on reception of the sent information, such that the user indicated by the target account can conveniently process the response information, so as to improve the efficiency of processing the response information.

In some embodiments, in response to determining that the response information includes an account identifier for indicating an account, the account indicated by the account identifier is determined as the target account.

In some embodiments, the user may designate a certain account as the target account by using, for example, an account identifier or an account name, such as @+account C (account C may be understood as an account name, and may alternatively be understood as an account identifier). That is, the user inputs @+account C to determine that account C is the target account, so that after the user completes the comment, the response information, the second document, and the position information may be sent to the device corresponding to account C.

For example, a browsing user may know that user C (a user indicated by account C) is more familiar with the selected object. Therefore, when the user comments on the first selected object, the user may determine the account C corresponding to user C as the target account, to cause user C to receive the first attachment document and the comment content, so that user C can receive the comment content inputted by the browsing user and the first attachment document.

As can be seen, through this configuration, the interaction manner of the response information is simplified, so that different users can receive the response information conveniently, and can be clearly informed of the selected object indicated by the response information.

In some embodiments, the device corresponding to the target account may present the response information, and may present the first selected object of the second document according to the received position information.

Here, the device corresponding to the target account may determine a presentation manner of the second document according to the position information. For example, the first selected object may be presented preferentially, so that the user indicated by the target account can quickly learn the first selected object and corresponding response information.

In some embodiments, a correspondence between the response information and the second document is adjusted in response to reception of a switching operation for the content area.

Here, after the switching operation is performed on the content area, content presented in the content area may be changed (for example, the content area may present the content of the second document, or may present a title of the second document). In other words, after the switching operation is performed for the content area, the content presented in the content area may change according to the instruction of the switching operation.

For example, the document content of the second document is currently presented in the content area, after the switching operation is performed for the content area, the content area presents only the title of the second document. At this time, the size of the content presentation area may be reduced, and since the selected object is not presented in content area, the response information may correspond to the second document.

Here, the switching operation may be a click operation. For example, a title control and a content control may be presented in the presentation interface. When the title control is clicked, the content area presents the title of the second document. When the content control is clicked, the content area presents the document content of the second document. Certainly, the specific operation form of the switching operation may be set according to the actual situation, and is not limited here.

In some embodiments, a response object of the response information is adjusted from the first selected object to the second document in response to content displayed in the content area being switched from first content to second content.

Here, the first content includes text content, and the second content includes title content.

In some embodiments, a response object of the response information is adjusted from the second document to the first selected object in response to content displayed in the content area being switched from second content to first content.

For example, in a case that the first content is text content and the second content is title content, when the first content is displayed in the content area, since the first selected object may be displayed, the response object of the response information may be the first selected object, so that the user can be clearly informed of the part of the second document that is commented. When the second content is displayed in the content area, since only the title content is displayed in the content area and no selected object is displayed at this time, the response object of the response information may be the second document. That is, in the process of browsing the first document, when the user browses to the title content of the second document, the user can be informed that some users have commented on the document content of the second document, so that the user can be informed of the attachment document of the first document that is commented when browsing the first document.

Figure 4A:
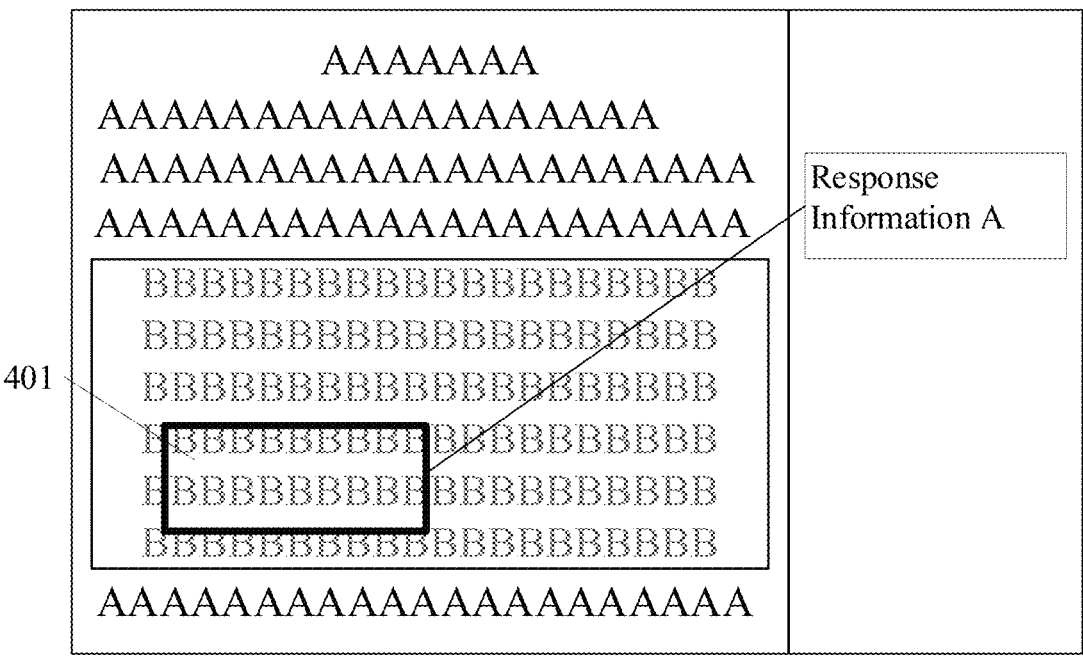
FIGS. 4A and 4B are schematic diagrams of an interaction method according to another embodiment of the present disclosure.
Figure 4B:
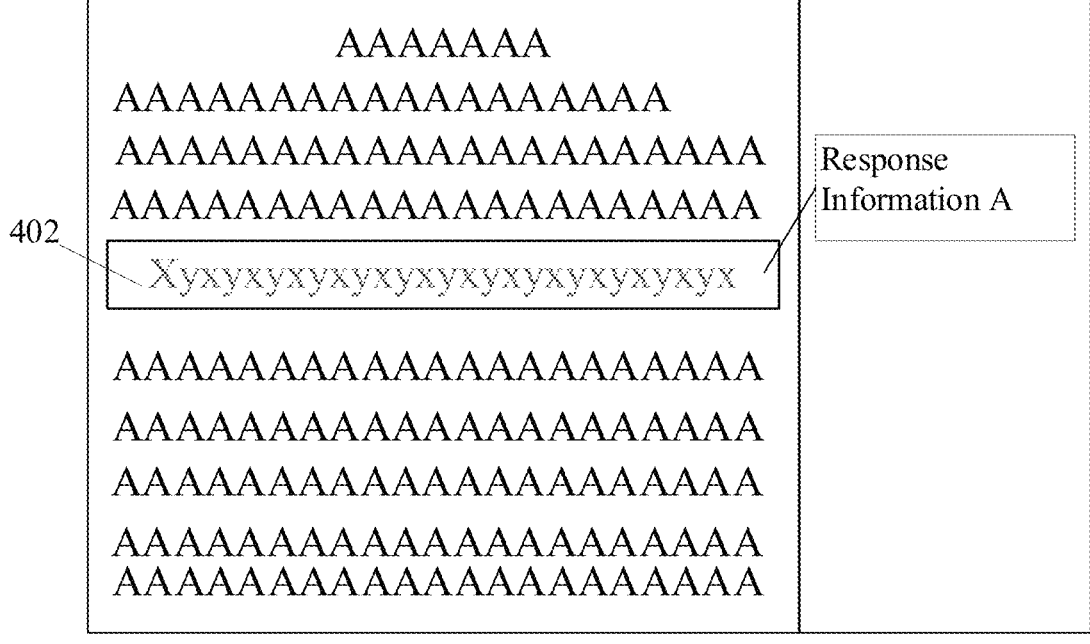

For ease of understanding, an example is given in conjunction with FIG. 4A and FIG. 4B to better understand the correspondence between the response information and the response object. FIG. 4A and FIG. 4B are schematic diagrams of a presentation interface for different response objects. As shown in FIG. 4A, the document content is presented in the content area, and if the user determines the document content in the rectangular frame 401 as the first selected object, the response object of response information A may be understood as the document content in the rectangular frame 401. As shown in FIG. 4B, the document title of the second document is presented in the content area, and the second document may be determined as the response object. That is, when the user browses the first document, the user can be informed of the comments on the second document.

In some embodiments, in response to existence of multiple pieces of response information, a display area of the multiple pieces of response information is adjusted in response to reception of a switching operation for the content area.

For example, multiple pieces of document content in the second document may be commented, therefore, there may be multiple pieces of response information in the second document.

Here, in response to the content displayed in the content area being switched from the first content to the second content, the multiple pieces of response information may be displayed in the same display area.

Here, in response to the content displayed in the content area being switched from the second content to the first content, the multiple pieces of response information displayed in the same display area may be displayed in respective display areas.

Here, the first content may include text content, and the second content may include title content.

For example, when the first content is presented in the content area, since the document content is presented, the pieces of response information are presented in respective corresponding display areas, such that the reader can be informed of the response object corresponding to each response information. However, when the second content is presented in the content area, the multiple pieces of response information may be displayed in the same display area, so that the user is informed of the comments on the second document.

Figure 5A:
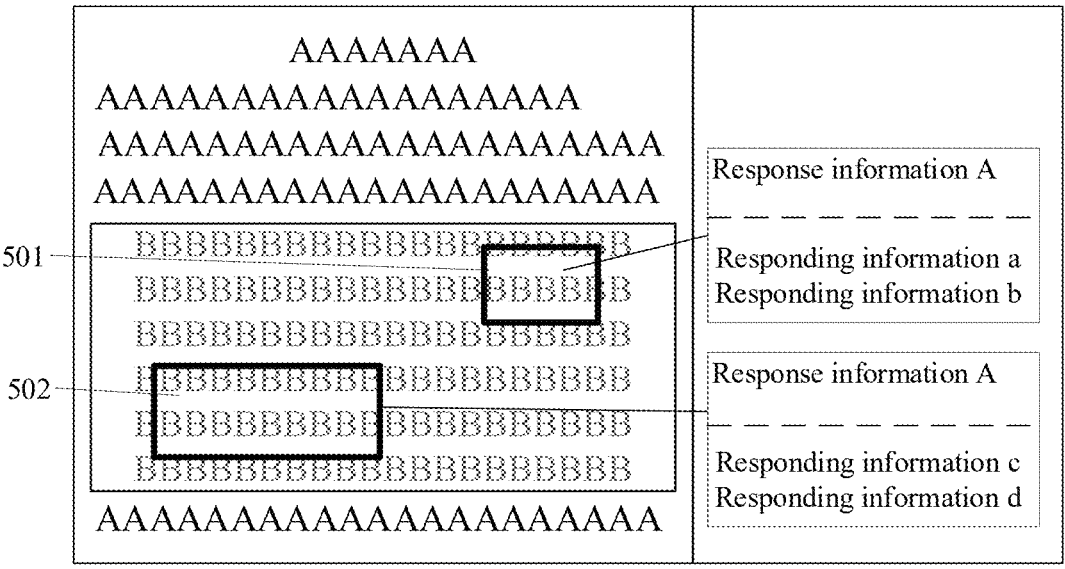
FIG. 5 is a schematic diagram of an interaction method according to another embodiment of the present disclosure.
Figure 5B:
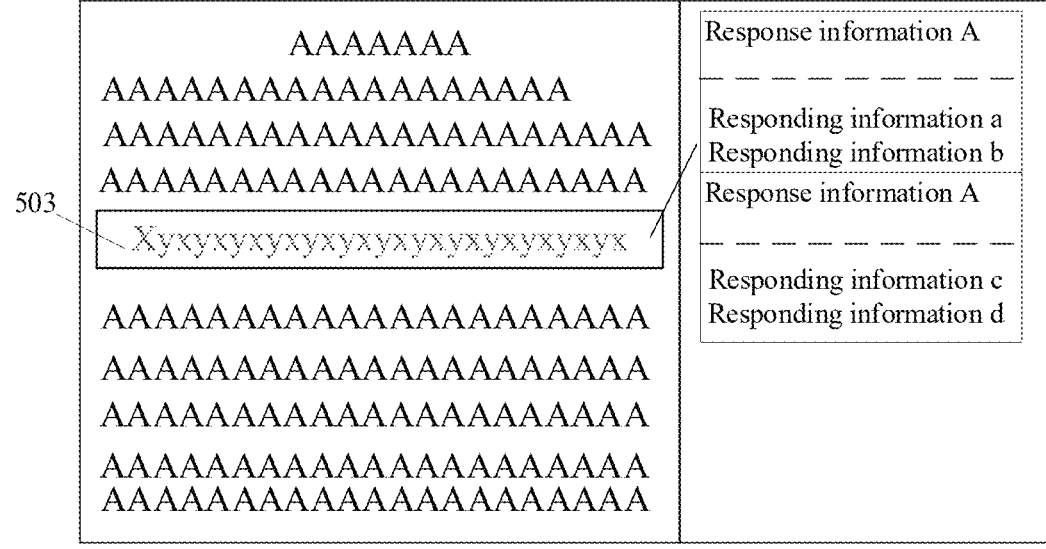

For ease of understanding, an example is given in conjunction with FIG. 5A and FIG. 5B to better understand how to adjust the display area of the response information. As shown in FIG. 5A, when the first content is presented in the content area, the user may make different comments on different content (which may be understood as the selected object), and in this case, the response information may correspond to the selected object, as shown in FIG. 5A, where the response object corresponding to response information A is a rectangular frame 501, and the response object corresponding to response information B is a rectangular frame 502. In this case, the response objects corresponding to response information A and response information B are different, so the response information A and response information B are displayed in different display areas. In addition, it can be seen that both response information A and response information B include responding information. For example, response information A includes responding information a and responding information b, and response information B includes responding information c and responding information d. As shown in FIG. 5B, when the second content is presented in the display area (that is, only the title content of the second document is presented in the content area 503), the response objects of the multiple pieces of response information are all the second document, in this case, the multiple pieces of response information may correspond to only one display area, and response information A and response information B are simultaneously presented in the display area.

Figure 5C:
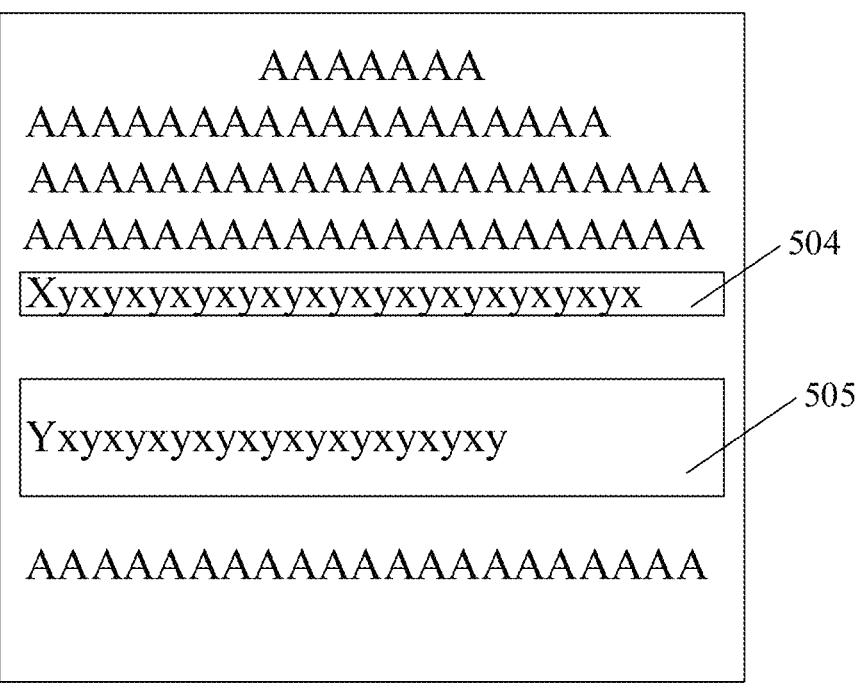

For example, when the second content of the second document is presented in the content area, the content area may have different sizes. For example, for some important attachment documents, the second content may be presented larger, while some less important document may be presented smaller. As shown in FIG. 5C, the titles of the documents are presented in content area 504 and content area 505, and the document presented in the content area 505 is more conspicuous than the document presented in the content area 504, and is easier to be found by users. In this way, the user can know which attachment documents may be more important, so that the user can read these attachment documents preferentially. In other words, the efficiency for the user to clearly understand the first document can be improved.

In some embodiments, the response information in the display area includes the above-mentioned selected object and responding information to the selected object. In response to the response information corresponding to a same selected object, the selected object and the multiple pieces of response information are displayed in the display area. In response to the response information corresponding to different selected objects, for each of the different selected objects, the selected object and responding information corresponding to the selected object are displayed in the display area.

Here, the responding information may be understood as reply information made by the user for the comment. Correspondingly, there may be multiple pieces of reply information for the same selected object. For example, different users may respond to the same comment.

For example, when the response information corresponds to the same selected object, the selected object may be displayed in the display area, and multiple pieces of responding information for the selected object may be presented, so that the user can easily see which response information the selected object corresponds to (the responding information may also be regarded as the response information for the selected object). When the response information corresponds to different selected objects, each different selected object and the responding information corresponding to each selected object may be displayed in the display area. Therefore, it is convenient for the user to know those comments on the selected object.

In some embodiments, the second document may correspond to at least one piece of response information. In this case, in response to detecting a selection operation for certain response information, the selected object corresponding to the response information selected by the selection operation may be presented.

For example, it may be understood that the second document corresponds to multiple pieces of response information. For example, multiple users may comment on the second document, or one user may comment on multiple pieces of document content of the second document. For example: user A comments on one document content of the second document, and user B comments on another document content of the second document.

For example, when the second document corresponds to multiple pieces of response information, in order for the user to accurately know the correspondence between the response information and the selected object, after the user performs the selection operation on certain response information, the selected object corresponding to the response information may be determined, and object prompt information corresponding to the selected object may be further presented. This design also enables the user to clearly know the selected object indicated by each response message.

Figure 6:
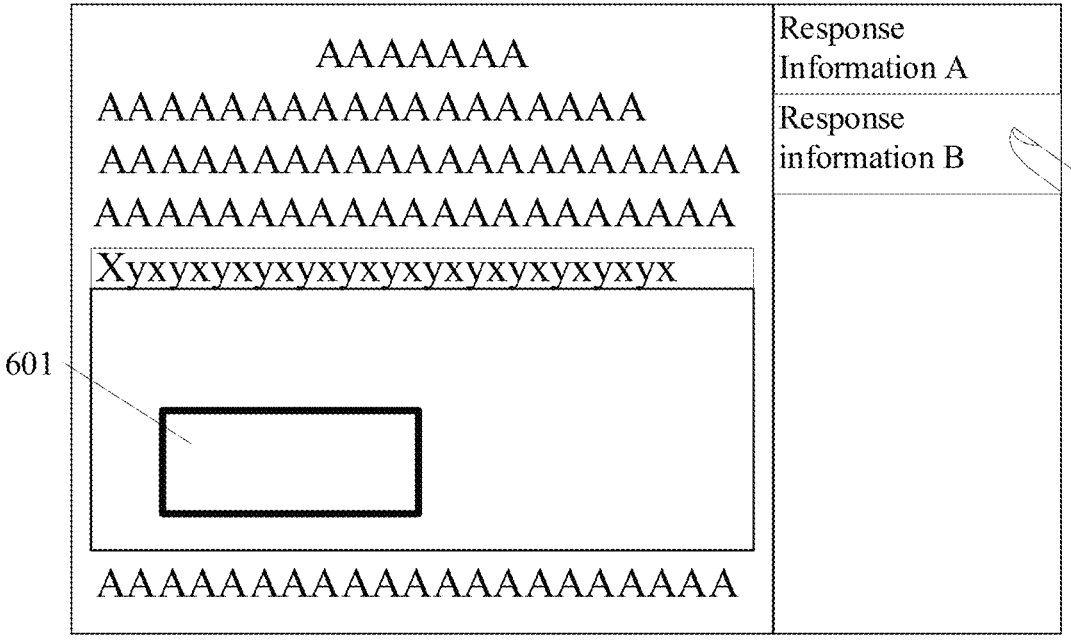
FIG. 6 is a schematic diagram of an interaction method according to another embodiment of the present disclosure.

For ease of understanding, reference is made to FIG. 6. The response information of the second document may be arranged sequentially. When the user clicks response information B, content of the response information B may be presented, and the selected object corresponding to response information B and object prompt information 601 corresponding to the selected object are also presented in the content area, so that the user can clearly know the selected object indicated by the response information B.

In some embodiments, in response to detecting that one or more pieces of response information is presented in the content area, target object prompt information is presented in a first form, and object prompt information other than the target object prompt information among one or more pieces of object prompt information is presented in a second form.

Here, the first form is different from the second form.

Here, the response object indicated by the target object prompt information may be understood as the response object selected by the user.

For example, the positions of the one or more pieces of object prompt information may be close to each other. When presenting the target object prompt information, other object prompt information may also be presented. Therefore, in order for the user to know the target selected object corresponding to the response information triggered by the user, the target object prompt information may be presented in the first form, and other prompt information may be presented in the second form. In this way, the user can determine the selected object indicated by the response information that is currently presented.

For example, the target object prompt information may be highlighted, and the brightness of other object prompt information may be lowered. Of course, the target object prompt information may be presented in other presentation forms. The presentation forms of the target object prompt information and other object prompt information are not limited here, and may be set according to the actual situation.

Figure 7:
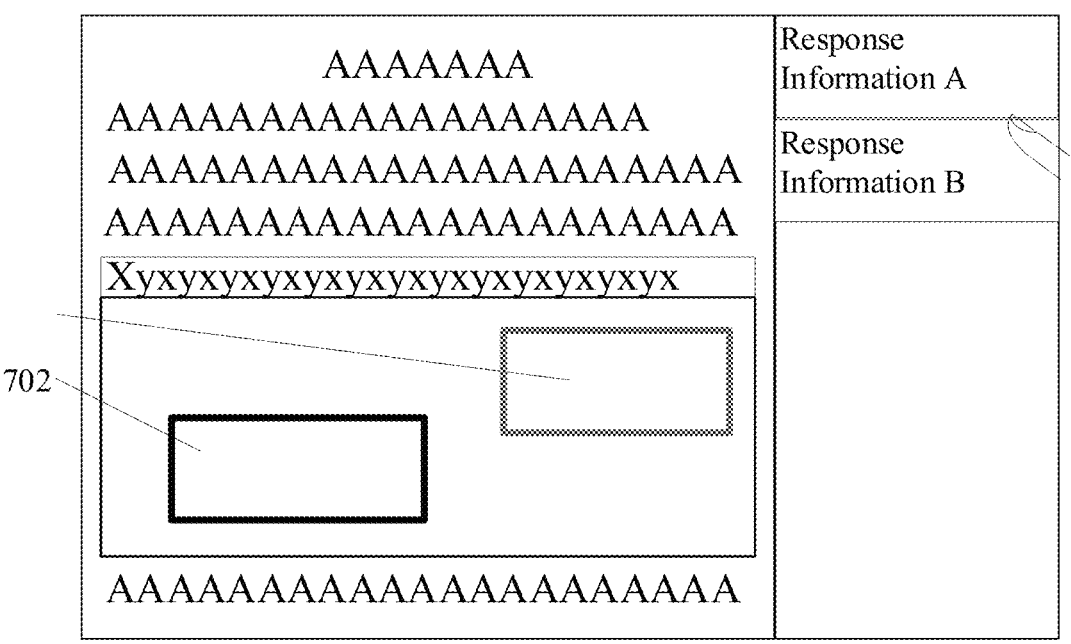
FIG. 7 is a schematic diagram of an interaction method according to another embodiment of the present disclosure.

For ease of understanding, reference is made to FIG. 7, the target object prompt information 702 and another object prompt information (second object prompt information) 701 are presented in the content area at the same time, and in this case, since the user triggers response information B, the content of response information B is presented. If response information B corresponds to the target selected object, the target object prompt information 702 may be highlighted to distinguish the second object prompt information 701 from the target object prompt information 702. In addition, presenting the second object prompt information 701 in the content area may remind the browsing user that the content recorded at the position of the second object prompt information 701 also has corresponding response information. That is, some users may comment on this content. In this way, when browsing the second document, the user can know which content of the second document is commented, and the user can clearly know the selected object corresponding to each comment.

In some embodiments, in response to detecting a response information hiding instruction, at least one piece of response information corresponding to the second document may be hidden, and at least one piece of object prompt information may be hidden.

For example, the user may input a comment hiding instruction to hide the response information and the object prompt information in the content area, so that only the document content of the second document is presented in the content area, and since there is no interruption from the object prompt information and the response information, the user can quickly browse the document content of the second document.

Here, a comment hiding control may be presented on the presentation interface, and when the user clicks on the control, it may be understood that the user inputs a response information hiding instruction. Certainly, in implementations, the user may input the response information hiding instruction in other ways, and the manner of inputting the response information hiding instruction is not limited here, and may be set according to the actual situation.

Figure 8:
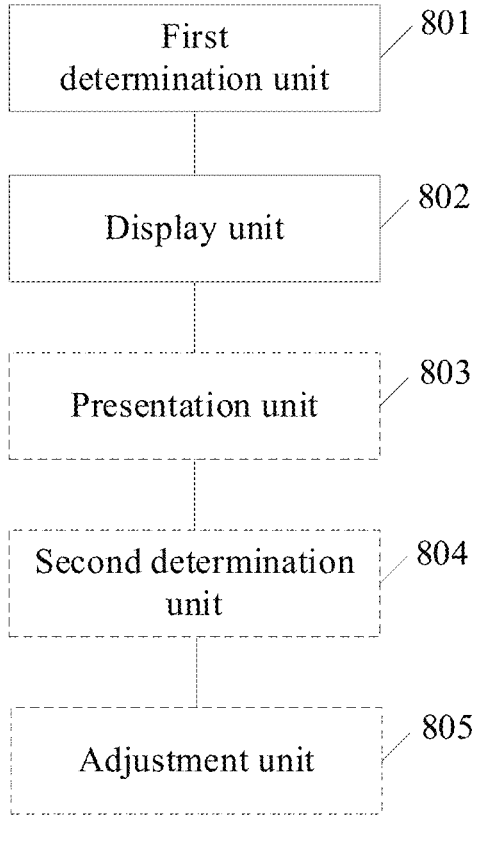
FIG. 8 is a schematic structural diagram of a commenting apparatus according to an embodiment of the present disclosure.

Referring to FIG. 8, for implementing the method shown in the above figures, a commenting apparatus is provided according to an embodiment of the present disclosure. The apparatus embodiment corresponds to the interaction method embodiment shown in FIG. 1. The apparatus may be applied in various electronic devices.

As shown in FIG. 8, the commenting apparatus according to this embodiment includes: a first determination unit 801, configured to determine a first selected object in response to reception of a first selection operation in a content area of a first document, where the content area is configured to display content of a second document displayed in the first document; and a display unit, configured to display response information in response to a response operation for the first selected object.

In some embodiments, the above apparatus further includes a presentation unit 803 configured to present object prompt information corresponding to the first selected object, wherein the object prompt information is used to indicate a selected object presented in the content area.

In some embodiments, the above display unit 802 is further configured to display, in response to reception of first response content in a first response area corresponding to the first selected object, the first response content in the first response area.

In some embodiments, the above display unit 802 is further configured to determine, in response to the response operation for the first selected object, a presentation position of the response information according to a presentation area of the second document; and present the response information at the presentation position.

In some embodiments, the above display unit 802 is further configured to: in response to detecting that the second document is presented in the content area, determining to present the response information in a display interface corresponding to the first document; and in response to detecting that the second document is presented in the display interface, determining to present the response information in the display interface.

In some embodiments, the above apparatus further includes a second determination unit 804, configured to determine position information of the first selected object in the second document; and send the response information, the second document and the position information to a device corresponding to a target account, where the target account includes at least one of following accounts: an account that creates the first document and an account that edits the second document.

In some embodiments, the device corresponding to the target account presents the response information, and presents the first selected object of the second document according to the received position information.

In some embodiments, the above apparatus further includes an adjustment unit 805, configured to adjust a correspondence between the response information and the second document in response to reception of a switching operation for the content area.

In some embodiments, the above adjustment unit 805 is further configured to adjust a response object of the response information from the first selected object to the second document in response to content displayed in the content area being switched from first content to second content, where the first content includes text content, and the second content includes title content.

In some embodiments, the above adjustment unit 805 is further configured to adjust a response object of the response information from the second document to the first selected object in response to content displayed in the content area being switched from second content to first content, where the first content includes text content, and the second content includes title content.

In some embodiments, the above adjustment unit 805 is further configured to, in response to existence of multiple pieces of response information, adjust a display area of the multiple pieces of response information in response to reception of a switching operation for the content area.

In some embodiments, the above adjustment unit 805 is further configured to display the multiple pieces of response information in a same display area in response to content displayed in the content area being switched from first content to second content, where the first content includes text content, and the second content includes title content.

In some embodiments, the above adjustment unit 805 is further configured to display the multiple pieces of response information displayed in a same display area in respective display areas in response to content displayed in the content area being switched from second content to first content, where the first content includes text content, and the second content includes title content.

In some embodiments, the response information in the display area includes the selected object and responding information to the selected object; and the above adjustment unit 805 is further configured to, in response to the response information corresponding to a same selected object, display the selected object and multiple pieces of responding information in the display area, and in response to the response information corresponding to different selected objects, for each of the different selected objects, displaying the selected object and responding information corresponding to the selected object in the display area.

Figure 9:
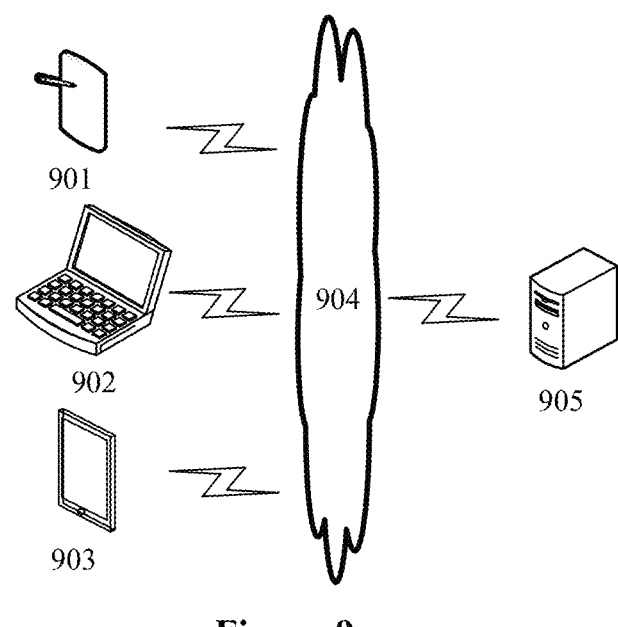
FIG. 9 shows an exemplary system architecture to which an interaction method according to an embodiment of the present disclosure is applicable.

Reference is made to FIG. 9, which shows an exemplary system architecture to which the interaction method according to an embodiment of the present disclosure is applicable.

As shown in FIG. 9, the system architecture may include terminal devices 901, 902, and 903; a network 904, and a server 905. The network 904 may be used as a medium to provide communication links between the terminal devices 901, 902, 903 and the server 905. Network 904 may include various connection types, such as wires, wireless communication links, fiber optic cables, and the like.

The terminal devices 901, 902, 903 can interact with the server 905 through the network 904 to receive or send messages and the like. Various client applications, such as web browser applications, search applications, and news information applications, may be installed on the terminal devices 901, 902, and 903. The client applications in the terminal devices 901, 902, and 903 can receive user instructions and complete corresponding functions according to the user instructions, such as adding corresponding information to information according to the user instructions.

Terminal devices 901, 902, and 903 may be hardware or software. When the terminal devices 901, 902, and 903 are hardware, they may be various electronic devices with display screens and supporting web browsing, including but not limited to smartphones, tablet computers, e-book readers, MP3 (Moving Picture Experts Group Audio Layer III) players, MP4 (Moving Picture Experts Group Audio Layer IV) players, laptop portable computers and desktop computers, and the like. When the terminal devices 901, 902, and 903 are software, they can be installed in the electronic devices listed above. It can be implemented as multiple software or software modules (such as software or software modules for providing distributed services), or as a single software or software module. No specific limitation is made here.

The server 905 may be a server that provides various services, such as receiving information acquisition requests sent by the terminal devices 901, 902, and 903, obtaining presentation information corresponding to the information acquisition requests in various ways according to the information acquisition requests, and sending data related to the presentation information to the terminal devices 901, 902, 903.

It should be noted that the information processing method according to the embodiments of the present disclosure may be executed by a terminal device, and correspondingly, the commenting apparatus may be disposed in the terminal devices 901, 902, 903. In addition, the information processing method according to the embodiments of the present disclosure may also be executed by the server 905, and accordingly, the information processing device may be disposed in the server 905.

It should be understood that the numbers of terminal devices, networks and servers in FIG. 9 are only illustrative. According to the implementation needs, there can be any number of terminal devices, networks and servers.

Figure 10:
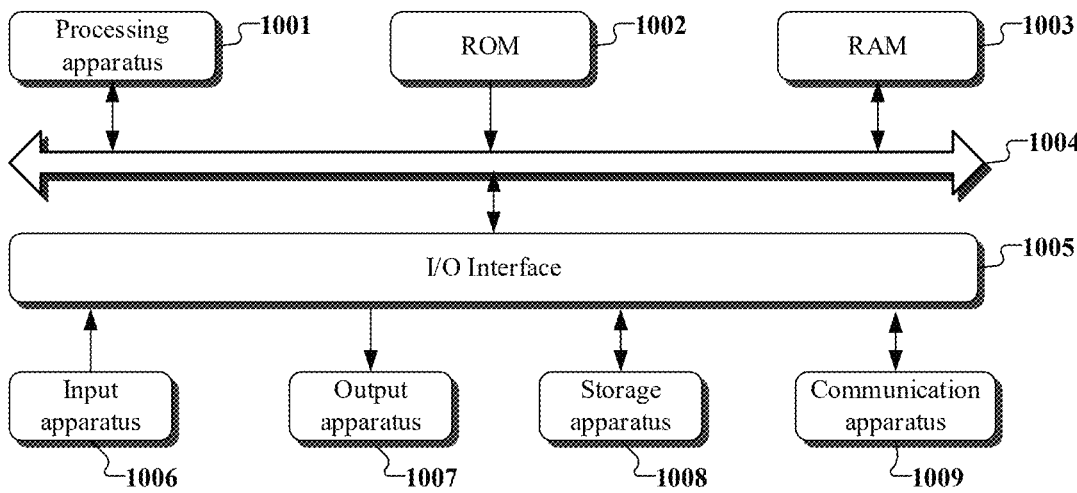
FIG. 10 is a schematic diagram of a basic structure of an electronic device according to an embodiment of the present disclosure.

Reference is made to FIG. 10, which shows a schematic structural diagram of an electronic device (for example, the terminal device or server in FIG. 9) suitable for implementing the embodiments of the present disclosure. The terminal device according to the embodiments of the present disclosure may include, but is not limited to, a mobile terminal such as a mobile phone, a laptop computer, a digital broadcast receiver, a PDA (a personal digital assistant), a PAD (a tablet), a PMP (a portable multimedia player), a vehicle-mounted terminal (such as an in-vehicle navigation terminal), and the like, and a fixed terminal such as a digital TV, a desktop computer, and the like. The terminal device shown in FIG. 10 is only exemplary, and should not indicate any limitation to the function and scope of application of the embodiments of the present disclosure.

As shown in FIG. 10, the electronic device may include a processing apparatus 1001, such as a central processing unit (CPU) or a graphics processor, which can execute various appropriate actions and processes based on a program stored in a Read Only Memory (ROM) 1002 or a program loaded from a storage apparatus 1008 into a Random Access Memory (RAM) 1003. In the RAM 1003, various programs and data required by the electronic device 1000 for operation are further stored. The processing apparatus 1001, the ROM 1002, and the RAM 1003 are connected to each other through a bus 1004. An input/output (I/O) interface 1005 is also connected to the bus 1004.

Generally, the following may be connected to the I/O interface 1005: an input apparatus 1006 such as a touch screen, a touch pad, a keyboard, a mouse, a camera, a microphone, an accelerometer, a gyroscope, an output apparatus 1007 such as a Liquid Crystal Display (LCD), a speaker, a vibrator, a storage apparatus 1008 such as a magnetic tape, a hard disk, and the like, and a communication apparatus 1009. Based on the communication apparatus 1009, the electronic device may communicate with other devices through wired or wireless communication to exchange data. Although FIG. 10 shows the electronic device including various apparatuses, it should be understood that not all shown apparatuses are required to be implemented or included. The shown apparatuses may be replaced by other apparatuses, or more or less apparatuses may be included.

In particular, the processes, described above with reference to flow charts, may be implemented as a computer software program according to some embodiments of the present disclosure. For example, a computer program product is provided according to an embodiment of the present disclosure, the computer program product includes a computer program carried on a non-transient computer readable medium. The computer program includes program codes for performing the method shown in the flowchart. In such embodiments, the computer program may be downloaded and installed from the network through the communication apparatus 1009, installed from the storage apparatus 1008, or installed from the ROM 1002. The computer program, when being executed by the processing apparatus 1001, performs functions defined in the method according to the embodiments of the present disclosure.

It should be noted that the computer readable medium according to the present disclosure, may be a computer readable signal medium or a computer readable storage medium or any combination of the two. The computer readable storage medium can be, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random-Access Memory (RAM), a Read-Only Memory (ROM), an Erasable Programmable Read-Only Memory (EPROM or Flash memory), an optical fiber, a portable Compact Disk Read-Only Memory (CD-ROM), an optical storage device, a magnetic storage device, or any suitable combination of the foregoing. In the present disclosure, the computer readable storage medium can be any tangible medium containing or storing a program, where the program can be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may have a variety of forms including, but not limited to, an electromagnetic signal, an optical signal, or any suitable combination of the above. The computer readable signal medium may also be any other computer readable medium except for the computer readable storage medium. The computer readable signal medium can send, transmit or transfer programs used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, an electric wire, an optical cable, RF (Radio Frequency), and the like, and any proper combination of the above.

In some embodiments, the client and the server can communicate by using any currently known or future developed network protocol such as HTTP (HyperText Transfer Protocol), and can be interconnected with digital data communication in any form or medium (for example, a communication network). Examples of the communication network include Local Area Network ("LAN"), Wide Area Network ("WAN"), an internet (for example, the Internet), and an end-to-end network (for example, the ad hoc end-to-end network), as well as any currently known or future developed network.

The computer readable medium may be included in the electronic device, or may exist alone, without being assembled into the electronic device.

The computer readable medium may carry one or more programs. The one or more programs, when executed by the electronic device, cause the electronic device to: determine a first selected object in response to reception of a first selection operation in a content area of a first document, where the content area is configured to display content of a second document displayed in the first document; and display response information in response to a response operation for the first selected object.

The computer program codes for performing the operations according to some embodiments of the present disclosure may be written in at least one programming language or a combination of the at least one programming language. The programming language includes, but is not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, functions indicated in the blocks may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Units involved in the embodiments of the present disclosure may be implemented by software or by hardware. The names of the units do not in any way constitute a limitation on the unit itself. For example, the first determination unit 801 may also be described as "a unit for determining a selected object".

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logical device (CPLD), and the like.

In the context of the present disclosure, the machine-readable storage medium may be a tangible medium that may contain or store a program to be used by an instruction execution system, apparatus or device or used in combination therewith. The machine-readable storage medium may be a machine-readable signal medium or a machine-readable storage medium. The computer-readable storage medium may include, but is not limited to, an electronic, magnetic, optical, electromagnetic, infrared, or semiconductor system, apparatus or device, or any suitable combination of the foregoing. More specific examples of the machine-readable storage medium include an electrical connection having one or more wires, a portable computer diskette, a hard disk, a Random-Access Memory (RAM), a Read-Only Memory (ROM), an Erasable Programmable Read-Only Memory (EPROM or Flash memory), an optical fiber, a portable Compact Disk Read-Only Memory (CD-ROM), an optical storage device, a magnetic storage device, or any suitable combination of the foregoing.

The above are only preferred embodiments of the present disclosure and are illustrative of the technical principles applied in the present disclosure. It should be understood by those skilled in the art that the scope of the embodiments of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features with (but not limited to) technical features having similar functions with the technical features disclosed in present disclosure.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. An interaction method, comprising:
displaying a first document, wherein the first document comprises an area containing a of link to a second document;
expanding the area containing the link to the second document into a preview window and displaying content of the second document in the preview window in response to receiving an operation performed on the link to the second document;
receiving a selection of a portion of the content of the second document displayed in the preview window;
receiving at least one comment on the portion of the content of the second document and an identifier of an account via a feedback window displayed in the first document;
switching the preview window back to the area containing the link to the second document in response to receiving user input;
displaying the at least one comment in the first document adjacent to the area containing the of link to the second document; and
sending the second document, the at least one comment, and information indicating a position of the portion of the content in the second document to a device corresponding to the identifier of the account received via the feedback window.

2. The method according to claim 1, further comprising:
presenting object prompt information corresponding to the portion of the content in the second document, wherein the object prompt information is used to indicate a selected object presented in the preview window.

3. The method according to claim 1, wherein the displaying the at least one comment comprises:
displaying, in response to receiving the at least one comment via the feedback window, the at least one comment in a first response area corresponding to the portion of the content in the second document.

4. The method according to claim 1, wherein the displaying the at least one comment comprises:
determining, in response to receiving the at least one comment via the feedback window, a presentation position of the at least one comment according to a presentation area of the second document; and
presenting the at least one comment at the presentation position.

5. The method according to claim 4, wherein the determining a presentation position of the at least one comment according to a presentation area of the second document comprises:
in response to detecting that the second document is presented in the preview window, determining to present the at least one comment in a display interface corresponding to the first document; and
in response to detecting that the second document is presented in the display interface, determining to present the at least one comment in the display interface.

6. The method according to claim 1, further comprising:
determining the position information of the portion of the content in the second document, wherein
the account comprises at least one of following accounts:
an account that creates the first document and an account that edits the second document.

7. The method according to claim 6, wherein the device corresponding to the identifier of the account presents the at least one comment, and presents the portion of the content in the second document according to the received position information.

8. The method according to claim 1, further comprising:
adjusting a correspondence between the at least one comment and the second document in response to reception of a switching operation for the content area.

9. The method according to claim 8, wherein the adjusting a correspondence between the at least one comment and the second document in response to reception of a switching operation for the content area comprises:
adjusting a response object of the at least one comment from the portion of the content in the second document to the second document in response to content displayed in the preview window being switched from first content to second content, wherein the first content comprises text content, and the second content comprises title content.

10. The method according to claim 8, wherein the adjusting a correspondence between the at least one comment and the second document in response to reception of a switching operation for the content area comprises:
adjusting a response object of the at least one comment from the second document to the portion of the content in the second document in response to content displayed in the preview window being switched from second content to first content, wherein the first content comprises text content, and the second content comprises title content.

11. The method according to claim 1, wherein the method further comprises, in response to existence of a plurality of comments:
adjusting a display area of the plurality of comments in response to reception of a switching operation for the preview window.

12. The method according to claim 11, wherein the adjusting a display area of the plurality of comments in response to reception of a switching operation for the preview window comprises:
displaying the plurality of comments in a same display area in response to content displayed in the comments being switched from first content to second content, wherein the first content comprises text content, and the second content comprises title content.

13. The method according to claim 11, wherein the adjusting a display area of the plurality of comments in response to reception of a switching operation for the preview window comprises:

displaying the plurality of comments displayed in a same display area in respective display areas in response to content displayed in the preview window being switched from second content to first content, wherein the first content comprises text content, and the second content comprises title content.

14. The method according to claim 12, wherein the displaying the plurality of comments in a same display area comprises:

in response to the plurality of comments corresponding to a same selected object, displaying the selected object and the plurality of comments in the display area, and in response to the plurality of comments corresponding to different selected objects, for each of the different selected objects, displaying the selected object and a subset of the plurality of comments corresponding to the selected object in the display area.

15. A device, comprising:

at least one processor; and at least one memory communicatively coupled to the at least one processor and storing instructions that upon execution by the at least one processor cause the device to:

display a first document, wherein the first document comprises an area containing a of link to a second document;

expand the area containing the link to the second document into a preview window and displaying content of the second document in the preview window in response to receiving an operation performed on the link to the second document;

receive a selection of a portion of the content of the second document displayed in the preview window;

receive at least one comment on the portion of the content of the second document and an identifier of an account via a feedback window displayed in the first document;

switch the preview window back to the area containing the link to the second document in response to receiving user input;

display the at least one comment in the first document adjacent to the area containing the of link to the second document; and send the second document, the at least one comment, and information indicating a position of the portion of the content in the second document to a device corresponding to the identifier of the account received via the feedback window.

16. The device of claim 15, the at least one memory further storing instructions that upon execution by the at least one processor cause the device to:

present object prompt information corresponding to the portion of the content in the second document, wherein the object prompt information is used to indicate a selected object presented in the preview window, or display, in response to receiving the at least one comment via the feedback window, the at least one comment in a first response area corresponding to the portion of the content in the second document.

17. The device of claim 15, the at least one memory further storing instructions that upon execution by the at least one processor cause the device to:

determine, in response to receiving the at least one comment via the feedback window, a presentation position of the at least one comment according to a presentation area of the second document; and present the at least one comment at the presentation position.

18. The device of claim 17, the at least one memory further storing instructions that upon execution by the at least one processor cause the device to:

in response to detecting that the second document is presented in the preview window, determining to present the at least one comment in a display interface corresponding to the first document; and in response to detecting that the second document is presented in the display interface, determining to present the at least one comment in the display interface.

19. A non-transitory computer-readable medium, bearing computer-readable instructions that upon execution on a computing device cause the computing device at least to:

display a first document, wherein the first document comprises an area containing a link to a second document;

expand the area containing the link to the second document into a preview window and displaying content of the second document in the preview window in response to receiving an operation performed on the link to the second document;

receive a selection of a portion of the content of the second document displayed in the preview window;

receive at least one comment on the portion of the content of the second document and an identifier of an account via a feedback window displayed in the first document;

switch the preview window back to the area containing the link to the second document in response to receiving user input;

display the at least one comment in the first document adjacent to the area containing the link to the second document; and send the second document, the at least one comment, and information indicating a position of the portion of the content in the second document to a device corresponding to the identifier of the account received via the feedback window.

\* \* \* \* \*